United States Patent
Lu

(10) Patent No.: US 6,710,287 B2
(45) Date of Patent: Mar. 23, 2004

(54) LASER ENGRAVING AND COLORING METHOD FOR A GOLF CLUB HEAD

(75) Inventor: Yuan-Ping Lu, Bade (TW)

(73) Assignee: Fu Sheng Industrial Co., Ltd., Taipei (TW)

( * ) Notice: Subject to any disclaimer, the term of this patent is extended or adjusted under 35 U.S.C. 154(b) by 20 days.

(21) Appl. No.: 10/291,838

(22) Filed: Nov. 12, 2002

(65) Prior Publication Data

US 2003/0085209 A1 May 8, 2003

(51) Int. Cl.[7] ........................... B23K 26/18; B23K 26/36
(52) U.S. Cl. ................................................. 219/121.69
(58) Field of Search ..................... 219/121.6, 121.61, 219/121.67, 121.68, 121.69, 121.72, 121.78, 121.85

(56) References Cited

U.S. PATENT DOCUMENTS 5,745,210 A * 4/1998 Biernat et al. ................ 351/41
5,851,335 A * 12/1998 Budnik et al. .............. 156/257

* cited by examiner

*Primary Examiner*—Samuel M. Heinrich
(74) *Attorney, Agent, or Firm*—Bacon & Thomas, PLLC

(57) ABSTRACT

A laser engraving and coloring method for a golf club head using a laser beam to process on a titanium alloy surface. Processing conditions of the laser beam are laser frequency in the range of 7500–35000 Hz, current in the range of 14–17 A, power in the range of 25–45 W, moving speed in the range of 5–55 M/sec, and process route as an ellipse to thereby form various predetermined colors.

15 Claims, No Drawings

LASER ENGRAVING AND COLORING METHOD FOR A GOLF CLUB HEAD

BACKGROUND OF THE INVENTION

1. Field of the Invention

The present invention is related to a laser engraving and coloring method for a golf club head and more particularly to a laser engraving and coloring method for a titanium (Ti) alloy surface of a golf club head by means of controlling processing conditions such as laser frequency, current, power, moving speed, and processing route.

2. Description of the Related Art

Conventional engraving and coloring methods for a golf club head are generally CNC (Computer Numeral Control), shot peening, normal laser engraving, which process golf club parts including a top, a sole, a striking plate, a neck, and a shaft. Then the golf club head is colored by spray paint process. These processing methods are most available for the golf club head to engrave grooves that can increase frictional force for more precise striking. The engraved grooves are further sprayed various paints for increasing visual effect.

However, the above-mentioned methods still results in defects in the engraving and coloring process achieved on the striking plate. For example, the CNC engraving process is difficult to precisely process a groove depth smaller than 0.1 mm. After having a groove depth exceeding 0.1 mm, an extremely thin thickness of the striking plate has a weak strength of stress. Consequently, a big golf club is unavailable for an extremely thin thickness of the striking plate which may weaken strength resisting a striking force. Moreover, etching by shot peening or repeatedly engraving by laser beam may reduce a groove depth in the range of 0.01–00.5 mm available for a big golf club. Processed by the shot peening or laser engraving process, a colored shallow groove may gradually be discolored and removed paint after repeatedly striking. The process quality of the groove depth and the paint on the striking plate is hard to be increased. Therefore, there is an increased need of a laser engraving and coloring method for a titanium alloy surface of a conventional striking plate.

The present invention intends to provide a laser engraving and coloring method by means of controlling processing conditions in such a way to mitigate and overcome the above problem.

After absorbing a predetermined amount of adequate energy, a titanium alloy surface is oxidized and formed various colors including yellow, blue, black, gradation color, and combination thereof. Meanwhile, due to an oxidized layer integrated with the titanium alloy surface, it can avoid discoloring after repeatedly striking.

SUMMARY OF THE INVENTION

The primary objective of this invention is to provide a laser engraving and coloring method by means of controlling processing conditions including laser frequency, current, power, moving speed, and processing route, which is adapted to simplify process, reduce manufacturing cost, and avoid discoloring.

The present invention is the laser engraving and coloring method for a golf club head using a laser beam to process on a titanium alloy surface. Processing conditions of the laser beam are laser frequency in the range of 7500–35000 Hz, current in the range of 14–17 A, power in the range of 25–45 W, moving speed in the range of 5–55 M/sec, and process route as an ellipse to thereby form various predetermined colors.

Other objectives, advantages and novel features of the invention will become more apparent from the following detailed description and the accompanying tables.

DETAILED DESCRIPTION OF THE INVENTION

The laser engraving and coloring method in accordance with the present invention uses a laser beam processing on a metal surface of a golf club head. The processing conditions of the present invention controls the laser beam in place by laser frequency, current, power, moving speed, and processing route so that the metal surface is oxidized in different degree by absorbing sufficient heat to thereby form various colors including yellow, blue, black, gradation color, and combinations thereof. Preferably, the metal surface is made of titanium alloy applied to golf club's parts including a top, a sole, a striking plate, a neck, and a shaft. A laser engraving machine that could potentially embody the present invention complies with Nd-YAG50W standard, (Nd-YAG, yttrium aluminum garnet laser). There are three embodiments of the present invention shown in following detailed description and the accompanying tables.

TABLE 1 compares a laser engraving and coloring method in accordance with the present invention with a conventional laser engraving method.

TABLE 1

Processing quality of the laser engraving method

| Item | The present invention method | The conventional method |
|---|---|---|
| Engraving method | Controlling laser frequency, current, power, moving speed, and processing route to oxidize on a metal surface, thereby forming with various colors | Controlling a laser beam by repeatedly running on a metal surface to form a groove |
| Color | Yellow, blue, black, and gradation color | Metallic |
| Luster | Excellent | Worst |
| Engraving Depth | 0.001–0.01 mm | 0.01–0.05 mm |
| Standard | Nd-YAG50W | Nd-YAG60W |
| Advantage | Fast processing speed, constant engraving quality, low manufacture cost, low noise, excellent appearance and luster, wear-resisting and simplifying process | Fast processing speed, constant engraving quality, low manufacture cost, low noise, but worst appearance and luster, no coloring |

TABLE 2 compares the laser engraving and coloring method in accordance with the three embodiments of the present invention with the conventional laser engraving method.

TABLE 2

Processing conditions of the laser engraving method

| Item | The present invention method | | | The conventional method |
|---|---|---|---|---|
| Color | Yellow | Blue | Black | Metallic |
| Laser frequency | 7,500– 15,000 Hz | 15,000– 25,000 Hz | 25,000– 35,000 Hz | 3,000– 5,000 Hz |
| Current | 14–16 A | 15–17 A | 15–17 A | 18 A |

TABLE 2-continued

Processing conditions of the laser engraving method

| Item | The present invention method | | | The conventional method |
|---|---|---|---|---|
| Power | 25–35 W | 35–45 W | 35–45 W | 60 W |
| Moving speed | 15–55 M/sec | 10–35 M/sec | 5–25 M/sec | 20 M/sec |
| Processing route | Ellipse | Ellipse | Ellipse | Straight line |

Referring to TABLE 2, the laser engraving and coloring method in accordance with a first embodiment of the present invention uses a laser beam processing on a titanium alloy surface of a golf club head to form a plurality of grooves, thereby increasing its friction for precisely striking golf. The laser engraving and coloring method is characterized in that processing conditions control the laser beam preferable by laser frequency in the range of 7,500–15,000 Hz, current in the range of 14–16 A, power in the range of 25–35 W, moving speed in the range of 15–55 M/sec, and processing route as an ellipse or the like. After processing under these processing conditions, the grooves of the titanium alloy surface have engraving depth in the range of 0.001–0.01 mm and have absorbed adequate heat to form with yellow on an oxidized surface. Since a yellow colored layer is deeply integrated with the titanium alloy surface, the grooves are capable of resisting discoloring after repeatedly striking. Moreover, the processing yellow color can be changed to light yellow, deep yellow, or gradation yellow by successively adjusting the processing conditions in order to provide with various yellow colors.

Referring to TABLE 2, the laser engraving and coloring method in accordance with a second embodiment of the present invention has processing conditions different from the first embodiment. Under the circumstances, the processing conditions are preferable laser frequency in the range of 15,000–25,000 Hz, current in the range of 15–17 A, power in the range of 35–45 W, moving speed in the range of 10–35 M/sec, and processing route as an ellipse or the like. After processing under these processing conditions, the grooves of the titanium alloy surface also have engraving depth in the range of 0.001–0.01 mm. In contrast with the first embodiment, the grooves accomplished by the second embodiment have further absorbed more heat to form with blue on an oxidized surface. Since a blue colored layer is deeply integrated with the titanium alloy surface, the grooves are capable of resisting discoloring after repeatedly striking. Moreover, the processing blue color can be changed to light blue, deep blue, or gradation blue by successively adjusting the processing conditions in order to provide with various blue colors.

Referring to TABLE 2, the laser engraving and coloring method in accordance with a third embodiment of the present invention has processing conditions different from the first and second embodiments. Under the circumstances, the processing conditions are preferable laser frequency in the range of 25,000–35,000 Hz, current in the range of 15–17 A, power in the range of 35–45 W, moving speed in the range of 5–25 M/sec, and processing route as an ellipse or the like. After processing under these processing conditions, the grooves of the titanium alloy surface also have engraving depth in the range of 0.001–0.01 mm. In contrast with the first and second embodiments, the grooves accomplished by the third embodiment have further absorbed more heat to form with black on an oxidized surface. Since a black colored layer is deeply integrated with the titanium alloy surface, the grooves are capable of resisting discoloring after repeatedly striking. Moreover, the processing yellow color can be changed to light blue, deep blue, or gradation blue by successively adjusting the processing conditions in order to provide with various black colors.

The processing conditions can be changed among the first through three embodiments so that combinations of yellow, blue, black, and gradation are available in the laser welding process. In addition, the predetermined colors are adapted to form designs, backgrounds, and characters if desired.

Referring again to TABLES 1 and 2, the laser engraving and coloring method in accordance with the present invention accomplishes coloring on a titanium alloy surface by controlling laser frequency, current, power, moving speed, and processing route, thereby forming with yellow, blue, black and gradation thereof By contrast, the conventional methods such as CNC engraving process, shot peening, normal laser engraving have drawbacks of incotrollable processing depth and discoloring surface paint after repeatedly striking.

Although the invention has been described in detail with reference to its presently preferred embodiment, it will be understood by one of ordinary skill in the art that various modifications can be made without departing from the spirit and the scope of the invention, as set forth in the appended claims.

What is claimed is:

1. A laser engraving and coloring method comprising:
   a laser beam adapted to engrave and color on a titanium surface of a golf club head by controlling processing conditions, including laser frequency in the range of 7,500–35,000 Hz, current in the range of 14–17 A, power in the range of 25–45 W, and moving speed 5–55 M/sec, thereby oxidizing the titanium surface to form with predetermined various colors.

2. The laser engraving and coloring method as defined in claim 1, wherein the processed titanium surface is formed with a yellow colored layer.

3. The laser engraving and coloring method as defined in claim 2, wherein the processing conditions are laser frequency in the range of 7,500–15,000 Hz, current in the range of 14–16 A, power in the range of 25–35 W, and moving speed 15–55 M/sec.

4. The laser engraving and coloring method as defined in claim 3, wherein the predetermined colors include light yellow, yellow, dark yellow, gradation yellow, and combinations thereof.

5. The laser engraving and coloring method as defined in claim 1, wherein the processed titanium surface is formed with a blue colored layer.

6. The laser engraving and coloring method as defined in claim 5, wherein the processing conditions are laser frequency in the range of 15,000–25,000 Hz, current in the range of 15–17 A, power in the range of 35–45 W, and moving speed 10–35 M/sec.

7. The laser engraving and coloring method as defined in claim 6, wherein the predetermined colors include light blue, blue, dark blue, gradation blue, and combinations thereof.

8. The laser engraving and coloring method as defined in claim 1, wherein the processed titanium surface is formed with a black colored layer.

9. The laser engraving and coloring method as defined in claim 8, wherein the processing conditions are laser frequency in the range of 25,000–35,000 Hz, current in the range of 15–17 A, power in the range of 35–45 W, and moving speed 5–25 M/sec.

10. The laser engraving and coloring method as defined in claim 9, wherein the predetermined colors include light black, black, gradation black, and combinations thereof.

11. The laser engraving and coloring method as defined in claim 1, 3, 6 or 9, wherein the processing condition includes processing route as an ellipse.

12. The laser engraving and coloring method as defined in claim 1, 2, 5 or 8, wherein the titanium alloy surface is applied to golf club's parts including a top, a sole, a striking plate, a neck, and a shaft.

13. The laser engraving and coloring method as defined in claim 12, wherein the processing conditions accomplishes a plurality of grooves.

14. The laser engraving and coloring method as defined in claim 13, wherein the grooves are processing depth in the range of 0.001–0.01 mm.

15. The laser engraving and coloring method as defined in claim 1, wherein the predetermined colors are adapted to form designs, backgrounds, and characters.

* * * * *